United States Patent Office 3,265,779
Patented August 9, 1966

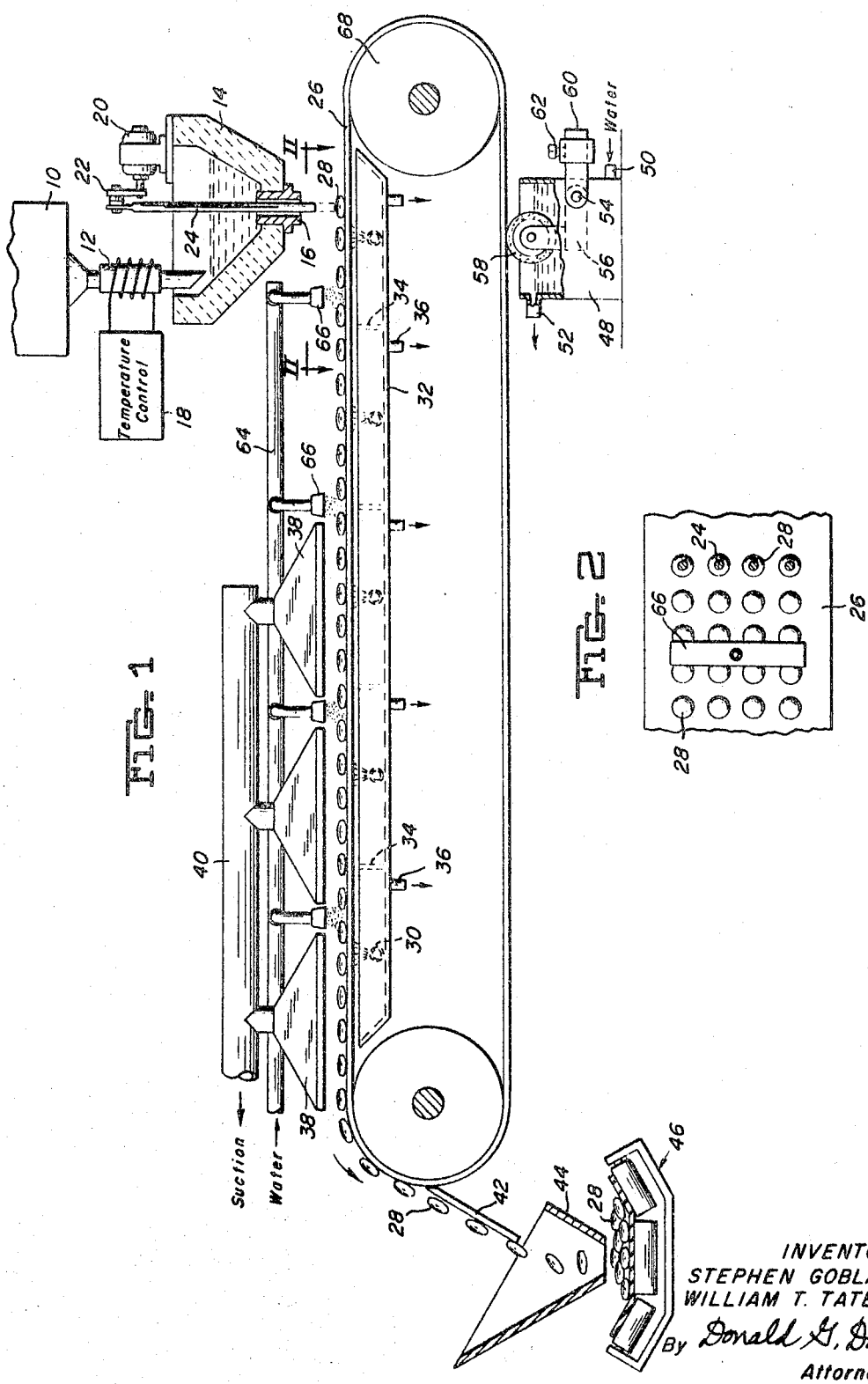

3,265,779
METHOD AND APPARATUS FOR PELLETIZING PITCH
Stephen Gobla and William T. Tate, Gary, Ind., assignors to United States Steel Corporation, a corporation of Delaware
Filed Dec. 6, 1963, Ser. No. 328,675
6 Claims. (Cl. 264—5)

This invention relates to an improved method and apparatus for pelletizing fusible materials such as chemicals, foods and more particularly, pitch.

Fusible materials are often sold in the form of pellets, usually obtained by cooling drops of the material deposited successively in molten condition on a moving support such as a cooled plate, cylinder or conveyor. Heated dripping pans provided with nozzles and extruding pistons may be used to provide the molten drops. One type of apparatus is described in Eilbracht et al. Patent No. 2,790,201.

Among the disadvantages of the above practice is the fact that the drops tend to adhere to the support. At the discharge end of the support, where the pellets are scraped from the support, a thin layer of solidified material is retained thereon. This layer builds up progressively, causing decreased cooling efficiency, and necessitates slowing down the moving support and eventually the complete shut-down for cleaning.

We have discovered a method and apparatus which are an improvement over the conventional method and apparatus and obviate the described disadvantages thereof. In accordance with our invention we apply a film of liquid to the surface of the moving support before depositing drops of the molten material thereon and thereby solidify the surface of the drops adjacent the support, with simultaneous film evaporation. Without other means for indirectly cooling the support, the drops lie freely thereon, are solidified into pellets and are freely discharged therefrom.

A complete understanding of the invention may be obtained from the following detailed description and explanation which refer to the accompanying drawings illustrating the present preferred practice. In the drawings:

FIGURE 1 is a diagrammatic representation in elevation, partly in section, of apparatus for pelletizing fusible material and apparatus associated therewith for carrying out the invention; and FIGURE 2 is a horizontal section taken on a line II—II of FIGURE 1.

Referring now in detail to the drawings, apparatus for pelletizing molten coal-tar pitch comprises a melting tank 10, discharging through a nozzle 12 to a transverse trough 14 having a plurality of spaced nozzles 16 depending therefrom. Means 18 senses the temperature in nozzle 12 and controls the temperature of the pitch in tank 10 by conventional means (not shown). A motor 20 drives an eccentric means 22, coupled to vertical pistons 24 reciprocable axially, one in each nozzle 16. In known manner the nozzles and pistons cooperate and deposit successively on a moving stainless steel belt 26 a plurality of drops 28 of molten pitch. The shape assumed by the drops on the belt will depend on such factors as temperature and viscosity, which may vary widely for coal-tar pitch, other pitches and fusible materials.

Nozzles 30 spray water from a source not shown on the underside of belt 26 to cool the pitch by conduction. The drops thereby become solid pellets as they move with the conveyor. The cooling water sprays are confined in a longitudinal trough 32, which may be divided into compartments by dividers 34. Each compartment is drained by a pipe 36 to a header, not shown. Vapors from the operation are exhausted by hoods 38, connected by a pipe 40, to exhaust means, not shown. The pellets are removed from the belt by a scraper 42 into a hopper 44 and are then carried by a conveyor 46 to shipping or storage facilities.

The apparatus described above and its operation are conventional. Our invention comprises the steps of applying a film of water to moving belt 26 before depositing pitch drops 28 thereon. The preferred apparatus comprises a tank 48, a water-supply pipe 50 leading thereto and a water drain pipe 52 leading therefrom, whereby a constant level of water is maintained in the tank. A shaft 54 is journaled in the tank wall. A pair of spaced arms 56, preferably L-shaped, extend radially from and are attached to shaft 54. Journaled in arms 56 is a pick-up roller 58, which may be a conventional paint roller. On the outside of the tank an arm 60 extends radially from and is attached to shaft 54. A counterweight 62 is slidably mounted on arm 60, tending to turn shaft 54 clockwise and to urge partially-immersed roller 58 into contact with belt 26, thereby applying a continuous film of water thereto.

While the combination of nozzles 16 and pistons 24 successively deposits drops 28 of pitch in known manner, according to our invention, the drops are deposited on the water film applied to belt 26. Initially, each drop of pitch is in contact with the film and not the belt. Molten pitch does not actually come into contact with the belt, since the drop surface in contact with the film solidifies immediately, with simultaneous film evaporation. Each drop therefore lies freely on the belt and does not adhere thereto. As the belt progresses, the drops are cooled and solidified to pellets and the pellets fall freely into hopper 44, without leaving a film or pitch layer on the belt.

Water sprays 30 are not necessary to effect the described results. They may be used, however, to increase pellet production by speeding up the belt and the drop-deposition rate. Additional or alternative cooling capacity for solidifying the pellets is provided by a water header 64 and spaced nozzles 66 depending therefrom to direct water sprays or mist on the drops. The volume of spray water is preferably controlled so as to be substantially completely evaporated by the time the pellets are discharged from the belt. The direct or indirect cooling or a combination thereof should be sufficient to prevent discharged pellets from sticking together.

The exact thickness of the liquid film applied to the belt may be varied according to such factors as the temperature of the material being pelletized, its specific heat and the temperature of the liquid applied. The film thickness may be controlled by the use of material dissolved in the liquid. Liquids other than water, not deleterious to the material being pelletized, may be used. The film thickness is preferably controlled by shifting counterweight 62 to urge roller 58 against the belt with lesser or greater pressure.

Liquid to produce a film may be applied any time after the pellets are discharged to hopper 44 and before the belt has completed travel around pulley 68. This is preferred, since control of film thickness immediately adjacent the area of drop deposition may become critical on this horizontal portion of belt travel. Should the liquid on the belt become a layer of appreciable thickness, there is a danger of increasing excessively the water content of the material being pelletized.

The liquid film may be applied by means other than a roller 58. For example, the belt 26 may pass through a trough containing the liquid. Alternatively, a modification of described spray nozzles 30 and trough 32 may be used or spray nozzles alone may be used. The described apparatus including roller 58 is preferred, however, since the roller aids in keeping the belt clean. Should the water supply to tank 48 be interrupted inadvertently, the roller will prevent build-up of a layer of material on the belt for a limited period of time, even in the absence of a liquid film thereon.

The invention is characterized by several distinct advantages. In the first place, our method and apparatus for preventing fusible material from adhering to a moving support are relatively simple, inexpensive and effective. Thus they permit handling of such material more economically than by conventional means. Secondly, our process and apparatus can be easily modified to handle various coal-tar pitches, other pitches and other fusible materials. Finally, by modifying conventional apparatus according to our invention, appreciable increases in pellet production may be effected.

Although we have disclosed herein the preferred practice of our invention, we intend to cover as well any change or modification therein which may be made without departing from the spirit and scope of the invention.

We claim:

1. In a method of pelletizing fusible material which comprises depositing molten drops thereof successively on a moving support, the improvement comprising applying a film of liquid to the surface of said support and depositing said drops on said film, controlling the thickness of said film so that it will be substantially completely evaporated in the area of contact of said film and drops, thereby solidifying the surface of said drops adjacent said support and inhibiting adherence of the drops thereto.

2. In a method of pelletizing fusible material which comprises depositing molten drops thereof successively on a moving support, the improvement comprising pressing a liquid-carrying roller against said support to apply a substantially continuous film of liquid to the surface of said support and then depositing said molten drops on said film, thereby flattening and solidifying the surface of said drops adjacent said support and inhibiting adherence of the drops thereto.

3. In a method of pelletizing fusible material which comprises depositing molten drops thereof successively on a moving support, the improvement comprising applying a substantially continuous film of liquid to the surface of said support and then depositing said molten drops on said film, thereby flattening and solidifying the surface of said drops adjacent said support and inhibiting adherence of the drops thereto, and applying a limited quantity of liquid to said deposited drops sufficient to cool them by evaporation of said liquid, leaving the resulting pellets substantially dry.

4. In an apparatus for pelletizing fusible material including a conveyor having a substantially flat surface and means to supply drops of molten material successively and substantially uniformly thereto, the improvement comprising film applying means including conveyor-contacting roller means engaging and frictionally driven by said conveyor, means to control the pressure of said roller against said conveyor, and means for supplying liquid to said roller, thereby applying to said conveyor ahead of the point at which the molten drops are deposited on film, a substantially continuous film of liquid of predetermined thickness, thereby flattening and solidifying the surface of said drops adjacent said conveyor.

5. The apparatus as defined in claim 4 characterized by a container, means for supplying liquid thereto, a shaft in said container, radial arms on said shaft, a liquid-carrying roller journaled in said arms and partially immersed in said liquid, an additional radial arm on said shaft opposed to said radial arms, a counterweight slidably mounted on said additional arm, whereby on shifting said counterweight said roller is urged against said conveyor with lesser or greater pressure.

6. In an apparatus for pelletizing fusible material including a conveyor and means to supply drops of molten material thereto, the improvement comprising means for applying a film of liquid to said conveyor ahead of the point at which the drops are deposited on said film, thereby effecting solidification of the surface of said drops adjacent said conveyor, spaced sprays directed toward said deposited drops, means for supplying liquid to said sprays and regulating means, whereby substantially all said liquid is evaporated in cooling said drops to solidified pellets.

References Cited by the Examiner

UNITED STATES PATENTS

| 1,649,960 | 11/1927 | Kratz. | |
| 2,939,172 | 6/1960 | Reppert | 18—2.4 |
| 3,076,999 | 2/1963 | Washburn. | |
| 3,208,101 | 9/1965 | Kaiser et al. | 264—13 |

ROBERT F. WHITE, *Primary Examiner.*

F. S. WHISENHUNT, J. R. HALL, *Assistant Examiners.*